United States Patent

[11] 3,568,961

| [72] | Inventor | James D. Iversen |
| | | Ames, Iowa |
| [21] | Appl. No. | 802,473 |
| [22] | Filed | Feb. 26, 1969 |
| [45] | Patented | Mar. 9, 1971 |
| [73] | Assignee | Iowa State University Research Foundation, Inc. |
| | | Ames, Iowa |

[54] AUTOROTATING DECELERATING SYSTEM FOR AERODYNAMIC BODY
4 Claims, 7 Drawing Figs.

[52] U.S. Cl. ................................................... 244/113, 244/3.21
[51] Int. Cl. ................................................... B64c 9/32
[50] Field of Search ................................................... 244/1 (SS), 138, 19—21; 244/113, 3.21, 3.23

[56] References Cited
UNITED STATES PATENTS

| 1,311,389 | 7/1919 | Guest | 244/21 |
| 2,004,885 | 6/1935 | Yanchus | 244/19 |
| 3,067,971 | 12/1962 | Dew | 244/113 |
| 3,098,445 | 7/1963 | Jackson | 244/138UX |
| 3,291,418 | 12/1966 | Brunk et al. | 244/138X |

Primary Examiner—Milton Buchler
Assistant Examiner—Paul E. Sauberer
Attorney—Dawson, Tilton, Fallon and Lungmus ABSTRACT: A system for decelerating an aerodynamic body includes at least two pair of rotor members mounted on the exterior of the body. Members of each pair are mounted at diametrically opposite locations on the body. The rotor members are adapted to rotate about axes perpendicular to the flight line of the body and thereby produce a drag on the body. By rotating the members to produce cancelling lift forces, a greatly increased drag force is induced on the body while maintaining its static stability. A modification is also disclosed for powering the rotor members.

PATENTED MAR 9 1971 3,568,961
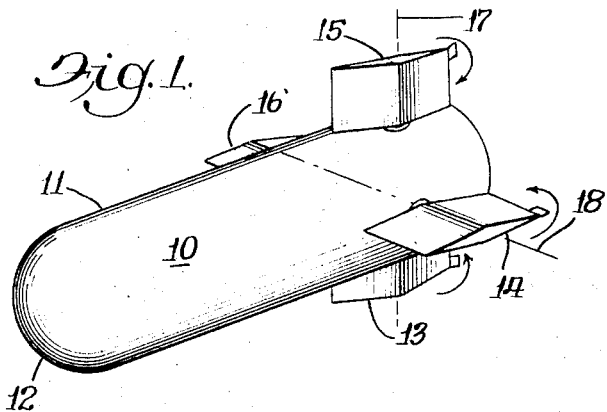
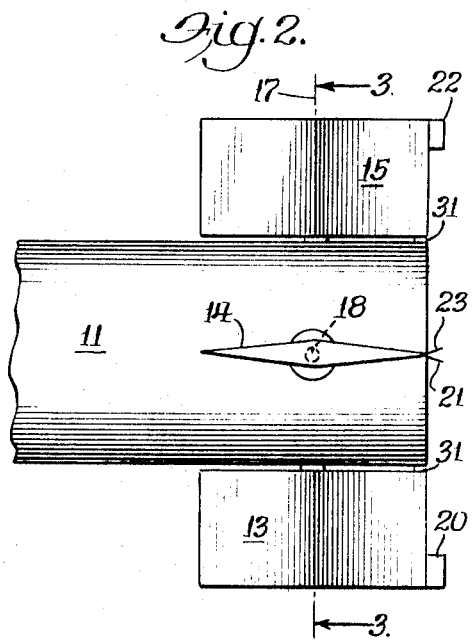
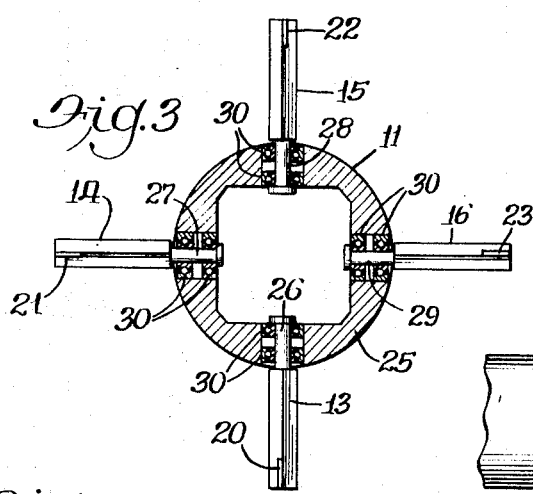
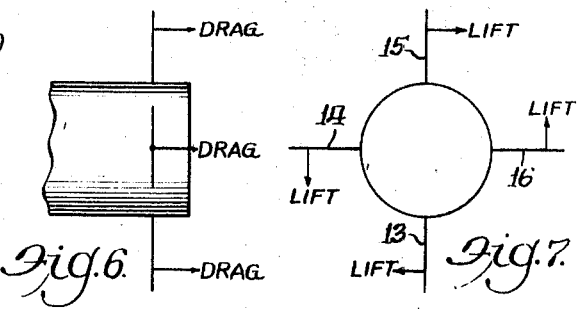
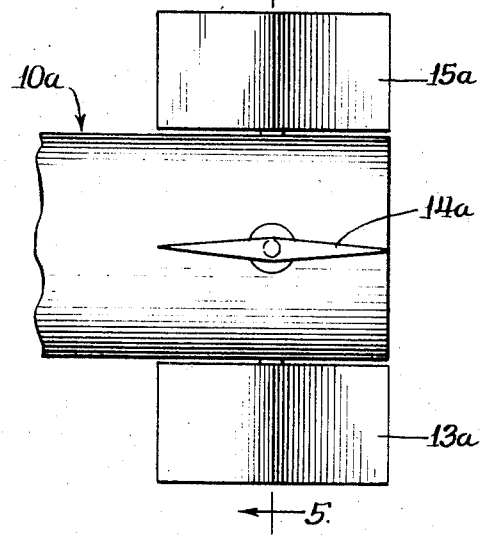
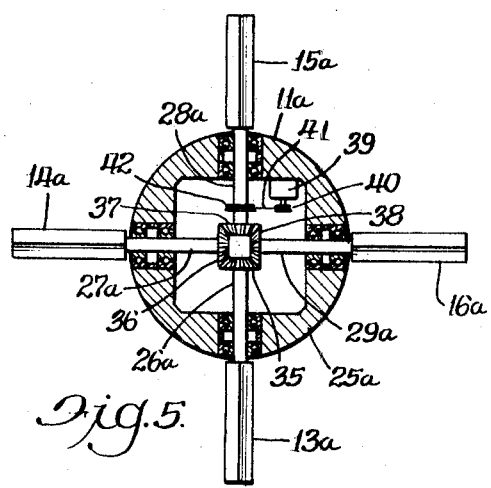
Inventor:
James D. Iversen
By:
Dawson, Tilton Fallon & Lungmus
Attys.

AUTOROTATING DECELERATING SYSTEM FOR AERODYNAMIC BODY

BACKGROUND

The present invention relates to a system of aerodynamic deceleration; and more particularly, to an aerodynamic deceleration system using rotors which serve a dual purpose as conventional fixed-fin flight stabilizers when not being used for deceleration.

The Magnus rotor is a cylinder of arbitrary cross section which rotates about an axis parallel to the axis of the cylinder and which moves through air in a direction perpendicular to the axis of the cylinder. Herein the word "cylinder" is used in its broad meaning, namely, a body (solid or hollow) having a surface which is formed by a straight line moving parallel to a fixed straight line (the axis) in a predetermined path and bounded at its ends by two parallel planes. If the cylinder is permitted to rotate, interaction with the wind stream will force it to do so; and a lift force and a drag force are thereby generated on the rotor.

Some rotors, such as the right circular cylinder, must be rotated by an external power source to generate the proper circulation to induce a lift. Others, for example, a simple flat plate cross section, will autorotate—that is, once the rotor is set in motion about its axis, it will continue to rotate and draw the necessary energy to sustain the rotation from the free airstream. Although a high lift force can be obtained from the Magnus rotor, a high drag force is also induced on it.

Heretofore, the primary usage for the auto-rotating mechanism has been to induce lift, whereas in the present invention, the primary objective of the autorotors is to induce a greatly increased drag on the aerodynamic body while minimizing the induced lift force.

Several applications of the Magnus rotor (first investigated by Gustav Magnus in 1853) including both the powered and the auto-rotating types have been investigated. For example, the Flettner rotor ship of the 1920's employed two powered vertical circular cylinders in place of sails.

The lift and drag characteristics of the powered rotors as determined by wind tunnel testing have also been reported. Such tests show that the lift generated on a rotating circular cylinder is only about half of the lift theoretically predicted by the so-called potential theory, i.e., $l = \rho V \Gamma$, where $\Gamma = 2\pi\alpha^2\omega$, where $l$ is the lift force;
$\rho$ is the air density;
$V$ is the forward velocity of the body through space;
$\Gamma$ is the circulation;
$\alpha$ is the radius of the circular cylinder; and
$\omega$ is the angular frequency of the rotor.

There have also been several interesting applications of the Magnus rotor in attempts to improve wind lift of airplanes. The rotor airplane, in which the conventional wind was replaced by driven circular cylinders proved unsuccessful. Although a lift coefficient as high as 15 can be achieved, a high drag coefficient (up to 5) is also produced. Rotors have been used in conjunction with conventional wings to produce an improvement in lift/ drag characteristics. For example, investigations have been made of the aerodynamic characteristics of airfoils with circular cylinders fitted into the leading edge. More recently, investigations have been made of the high-lift properties of wing-flap combinations with a driven circular cylinder fitted into the leading edge of the flap.

Suggestions have also been made to add small strips to the surface of bodies of revolution. The strips cause the body of revolution to autorotate about a transverse axis, inducing a great increase in drag over the stabilized body and thereby retarding descent to the atmosphere. The present application precluded the necessity of rotating the entire body. Heretofore, the high drag characteristic of the rotating section has been deemed to limit its application; however, in the present invention, this characteristic is used to decelerate the aerodynamic body.

In the present invention, auto-rotating fins are mounted exterior of a body of revolution; and in a preferred embodiment, the cross section of the fins is diamond-shaped or double-wedged. When in fixed position, the fins serve as flight stabilizers, hence they have a cross-sectional dimension in the direction of flight which is much greater than its corresponding cross-sectional dimension in a plane transverse of the flight direction. The fins are fixed on the body to stabilize it in flight; and when set in motion, they autorotate (or are driven by a separate source of power) about axes which lie in a plane transverse of the flight direction. By employing four such rotors equally angularly spaced about the aerodynamic body and by insuring that adjacent rotors rotate in opposing directions, the net lift force is zero whereas the induced drag forces are cumulative thereby greatly increasing the total drag on the aerodynamic body while maintaining its static stability.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a perspective view of an aerodynamic body incorporating the present invention;

FIG. 2 is a side elevation view of the system of FIG. 1;

FIG. 3 is a cross section view of the system of FIG. 1 adapted for autorotation;

FIG. 4 is a side elevation of a driven rotor system incorporated in the system of FIG. 1;

FIG. 5 is a cross section view taken through the sight line 5—5 of the driven system of FIG. 4; and FIGS. 6 and 7 are schematic diagrams illustrating the drag and lift forces respectively on the systems of FIGS. 1—5.

DETAILED DESCRIPTION

Referring to FIG. 1, an axisymmetric body is generally designated 10. The axisymmetric body 10 includes a circular cylinder 11 and a nose portion 12 which is a hemisphere. It will be understood that the invention is not limited to the particular axisymmetric body shown, but that any axisymmetric aerodynamic shape may be used. Four fins 13, 14, 15 and 16 are mounted to the cylinder 11; and the axes of fins 13 and 15 extend along a common line in a generally vertical direction for the position shown. The fins 14 and 16 also have their axes colinear and in the same plane as the axes of the fins 13 and 15 but perpendicular thereto.

The common axis of the fins 13 and 15 is designated by the chain line 17; and the common axis of the fins 14 and 16 is designated by the chain line 18. Thus, the fins are arranged in a cruciform configuration.

Each of the fins 13—16 has a cross section which is double-wedged or diamond-shaped. The cross sections of the fins are elongated in the direction of flight; and in the fixed position shown in FIGS. 1—3, they serve as flight stabilizers. Each of the fins 13—16 is provided with an appended tab extending from the outer portion of its rear edge. The tab appended to the fin 13 is designated 20; and looking from the rear (FIG. 3), the tab 20 is inclined to the left of the longitudinal plan of symmetry of fin 13. Similarly, a tab 21 is appended to fin 14. The tab 21 is inclined rearwardly and downwardly of the longitudinal plane of symmetry of the fin 14.

Similar tabs 22 and 23 are attached to the fins 15 and 16 respectively. The tab 22 extends to the right of the longitudinal plane of symmetry of the fin 15; and the tab 23 extends upwardly of the longitudinal plane of symmetry of the fin 16. In the case of the auto-rotating fins, the tabs 20—23 are provided to bias their respective fins in the proper rotational direction to cancel lift forces, as will be made clear.

Referring now to FIG. 3, the cylindrical body 11 includes a wall 25 through which are journaled shafts 26, 27, 28 and 29 to which are mounted respectively the fins 13—16. Each of the fin shafts is provided with a flange interior of the wall 25 for securing it thereto; and each shaft is rotatably journaled in the wall 25 by means of a pair of bearings designated 30. Explosive pins 31 are secured between the cylindrical body 11 and the rear portion of each of the fins 13—16 for securing the same in their desired fixed-fin configuration.

When deceleration is desired, the pins 31 are fired; and the fins are free to rotate. The tabs 20—23 cause the fins to rotate such that if the sides of the body 10 were peeled open to lie in a single plane adjacent fins rotate in opposite directions. That is, looking along the axis of the fin 14 toward the center of the body 10, the tab 21 being bent downwardly will cause the fin 14 to rotate in a counterclockwise direction. When looking along the axis of rotation of the fin 15 the tab 22 will cause it to rotate clockwise. When similarly viewed, the fin 16 rotates counterclockwise, and the fin 13 rotates in a clockwise direction. It will, however, be appreciated that opposite pairs of fins 14 and 16, and 13 and 15 rotate in opposite directions when viewed along a common line stability sight. The fins are located well behind the center of gravity of the body of revolution illustrated to ensure stability in deceleration.

As has already been mentioned, each of the fins while autorotating produces both a drag and a lift force. Assuming the airstream is moving from the nose 12 toward the fins along the line of flight, the drag and lift vectors are schematically illustrated in FIGS. 6 and 7 respectively. The drag forces on each of the fins 13—16 is exerted in a rearward direction; and they are additive. The lift force for the bottom fin 13 is to the left and perpendicular to the vertical axis of rotation 17 of the fins 13 and 15. Similarly, the lift force for the fin 14 is directly downwardly; the lift force on the fin 15 is to the right; and the lift force induced on the fin 16 is directly upwardly. Assuming that all of the lift forces are equal, it can be seen from FIG. 7 that the net lift force is zero since the vectors add to zero.

Turning now to FIGS. 4—5, an embodiment is shown wherein the fins are driven by an independent power source. The four fins are designated 13a, 14a, 15a, and 16a; and they are received on shafts 26a, 27a, 28a, and 29a respectively. The shafts 26a—29a are journaled in the wall 25a of a cylindrical portion 11a of a body 10a which may be otherwise identical to the previously described body 10. The interior portion of the shafts 26a is provided with a miter gear 35; and all of the other shafts 27a—29a are similarly provided with a miter gear designated 36, 37, and 38 respectivey. The gears 35—38 are arranged so that adjacent gears mesh; and this arrangement insures the necessary opposite rotation of adjacent fins as previously described. A motor 39 is mounted to the wall 25a; and it drives a pulley 40 on which is wound a belt 41 to drive a similar pulley 42 mounted on the shaft 28a.

Thus, the motor 29 drives all of the shaft 26a—29a through the miter gear arrangement; and there is no need for the rear tabs in the previously described auto-rotating embodiment, nor is there any need for the explosive pins to maintain the fins in their flight stabilizing fixed position.

The embodiment of FIGS. 4 and 5 provides rotation of the fins at a controlled rate which may be faster than the autorotation angular velocity. Larger drag forces are achieved if the fins rotate faster than the autorotation rate; and thus, the driven fins can provide even larger deceleration forces than the auto-rotating system of FIGS. 1—3.

The static stability of the fixed-fin configuration, of course, derives from the lift of the fin when the body is inclined at an angle of attack. In the auto-rotating configuration, the stability must come from the drag of the fins, since the lift forces cancel each other.

In table 1, reproduced below, values of the static stability ($C_M$) determined from static wind tunnel tests and from one-degree-of freedom dynamic wind tunnel tests, are tabulated. The pitching moment coefficient here is with respect to a center of gravity located on the body centerline 30 percent of the body length behind the nose. The reference area and length are the body cross-sectional area and body diameter respectively.

TABLE 1

| | Body alone | Body with fixed fins | Body with auto-rotating fins |
|---|---|---|---|
| Static test: | | | |
| Static stability, $C_{M_\alpha}$ | +0.5 | −6.5 | −5.7 |
| Drag, $C_D$ | 0.2 | 0.21 | 3.78 |
| Dynamic test: | | | |
| Static stability, $C_{M_\alpha}$ | +0.2 | −6.1 | −4.4 |
| Damping, $C_{M_q}+C_{M_{\dot\alpha}}$ | −24 | −34 | [1] −7−−30 |

[1] Nonlinear.

The contribution of the fixed fin to static stability can be approximately expressed, neglecting interference effects, as:

$$C_{M\alpha}=C_{L\alpha_F}\frac{x_1 S_F}{dS}$$

where $C_{L\alpha_F}$ is the slope of the fin stabilizer/lift curve, $\gamma$ $C_{L_F}/\gamma\alpha$;

$x_1$ is the moment arm, center of gravity to fin stabilizer center of pressure;
$S_F$ is the stabilizer fin planform area, per fin;
$d$ is the diameter of the hemisphere cylinder; and
$S$ is the reference area.

The auto-rotating fin contribution is:

$$C_{M\alpha}=-2C_{D_R}\frac{x_R}{d}\frac{S_F}{S}$$

where $C_{D_R}$ is the rotor stabilizer drag coefficient; and $x_R$ is the moment arm from the center of gravity to the rotor stabilizer axis.

The static stability and the two moment arms $x_1$ and $x_R$ of the two configurations are nearly the same. The auto-rotating fin drag coefficient $C_{D_R}$ is about the same as the fixed-fin lift curve slope $C_{L\alpha_F}$ (i.e., on the order of two to three).

The high drag coefficient of the auto-rotating configuration, desired for deceleration purposes, is about a factor of eighteen greater than that for the fixed-fin configuration or for he body without such fins. The aerodynamic damping of the auto-rotating configuration is less than the fixed-fin damping, and is somewhat nonlinear. However, the auto-rotating configuration still has positive dampening.

Thus, the high drag force of the auto-rotor is applied as a stabilizing force for a body of revolution. The drag of the body is greatly increased while a static stability is only slightly affected.

Having thus described in detail preferred embodiments of the present invention including an auto-rotating configuration and a powered-fin configuration, it will be appreciated that a number of fin structures may be used in addition to the double-wedged cross section shown. In particular, the cross section of the fin could be a flat plate, two opposing intersecting circular arcs, a circle with tangential vanes, a triangle with vanes extending along the edges thereof, a modified rectangle, a modified rectangle with vanes, or a Savonius. However, fins having symmetry about a plane passing through the axis of the body of revolution are preferred if it is desired to use the fins in the fixed-fin arrangement also. It is therefore intended that all modifications and equivalents of the inventive system be covered as they are embraced within the spirit of the invention.

I claim:

1. A system for decelerating an aerodynamic body comprising at least first and second pairs of cylindrical members mounted on the exterior of said body for selective rotation about respective axes lying in a plane perpendicular to the direction of flight of said body; and means on said cylinder members to cause them to rotate in directions producing opposing lift forces whereby said body is decelerated when said cylinders rotate while remaining statically stabilized.

2. The system of claim 1 wherein said cylindrical members are fins mounted in a first fixed position for stabilizing the flight of said body, and further comprising means for selectively setting said fins in rotation to produce said drag force.

3. The system of claim 2 wherein said fins each have a double-wedge cross section elongated in the direction of flight when said fins are in said fixed position, adjacent of said fins rotating in opposite directions to produce a zero net lift force on said body.

4. The system of claim 1 further comprising power means for driving said fins in rotary motion of predetermined direction to produce a zero net lift force on said body and at an angular velocity greater than the auto-rotating mode.